United States Patent [19]

Zanichelli

[11] Patent Number: 4,940,598

[45] Date of Patent: Jul. 10, 1990

[54] PROCESS FOR THE RAPID REHYDRATION OF LEGUMES AND THE LIKE

[75] Inventor: Giuseppe Zanichelli, Parma, Italy

[73] Assignee: Zanichelli Meccanica S.P.A., Parma, Italy

[21] Appl. No.: 129,012

[22] Filed: Dec. 4, 1987

[30] Foreign Application Priority Data

Aug. 20, 1987 [IT] Italy ............................... 21683 A/87

[51] Int. Cl.⁵ ................................................. A23L 1/48
[52] U.S. Cl. ..................................... 426/507; 426/511
[58] Field of Search ............... 426/507, 508, 510, 511, 426/634

[56] References Cited

U.S. PATENT DOCUMENTS

| | | | |
|---|---|---|---|
| 2,135,593 | 10/1935 | Nohe | 426/507 |
| 2,232,282 | 2/1941 | Struble | 426/634 |
| 2,584,150 | 2/1952 | Morris | 426/507 |
| 3,745,019 | 7/1973 | Hupsoll et al. | 426/508 |
| 3,876,807 | 4/1975 | Wagner | 426/634 |

FOREIGN PATENT DOCUMENTS

| | | | |
|---|---|---|---|
| 0012945 | 1/1985 | Japan | 426/508 |
| 1074553 | 4/1986 | Japan | 426/507 |
| 2138159 | 6/1987 | Japan | 426/508 |
| 87263 | 9/1936 | Sweden | 426/507 |

*Primary Examiner*—Peter Kratz
*Attorney, Agent, or Firm*—Guido Modiano; Albert Josif

[57] ABSTRACT

A process consists of subjecting the mass of loose product to be rehydrated to a treatment with a hot fluid, for an adjustable preset time interval, and then with a cold fluid, for another preset time interval, and of and successively repeating the treatment with hot fluid and with cold fluid until the preset rehydration percentage is attained. The apparatus includes an assembly introducing the product into a tank containing hot water and having a screw feeder which feeds the product to a discharge collector. Transfer means, in the discharge collector, conveys the product to a cooling assembly.

10 Claims, 2 Drawing Sheets

PROCESS FOR THE RAPID REHYDRATION OF LEGUMES AND THE LIKE

BACKGROUND OF THE INVENTION

The present invention relates to a process and an apparatus for the rapid rehydration of legumes and the like.

As is known, in the food-preserve industry, in order to rehydrate legumes and the like to be packaged, tanks are currently used, generally having considerable dimensions, in which the product to be rehydrated is immersed and has to remain in the water for a relatively long period of time, of the order of a few hours, so as to absorb the required amount of water.

Considerable productive disadvantages are usually encountered with this procedure, since it is necessary to provide a high number of tanks in order to ensure production continuity.

Moreover, the processing occurs discontinuously, since a large amount of product to be processed is accumulated at the end of the rehydration, followed by idle times which depend on the number of available tanks; the fact must furthermore be stressed that it is necessary to set an organization of production which does not allow to vary the program, since once the product is rehydrated it must be packaged quite immediately; on the other hand, there is no possibility of programming a short rehydration, due to the high number of hours required to obtain rehydration.

Trying to eliminate this disadvantage, machines have already been tested on the market which treat the product to be rehydrated with hot water, achieving, however, not fully satisfactory results in terms of the percentage of water absorbed by the dry product and in terms of the uniformity of the treatment, so that these machines have had no practical development.

SUMMARY OF THE INVENTION

The aim proposed by the invention is indeed to eliminate the above described disadvantages by providing an apparatus for the continuous rapid rehydration of dried products such as legumes and the like, which drastically reduces the times required for the desired rehydration, furthermore allowing a continuous flow of the rehydrated product.

Within the scope of the above described aim, a particular object of the invention is to provide a rehydration apparatus and a rehydration process which, though executing the rehydration in extremely reduced times, assessable at approximately half an hour, create no appreciable variations in the organoleptic characteristics of the product.

Still another object of the present invention is to provide an apparatus which causes the dry product to absorb the desired percentage of water, without having to resort to modifications in the subsequent packaging treatments with respect to conventional methods.

Not least object of the present invention is to provide an apparatus and a process which allow to pack the rehydrated legumes without requiring long programming times which currently entail the introduction of the dried products in the rehydration tanks at least the day before, so as to have them ready the following day for packaging.

The above described aim, as well as the objects mentioned and others which will become apparent hereinafter, are achieved by a process for the rapid rehydration of legumes and the like, characterized in that it consists of alternately subjecting the mass of loose product to be rehydrated to a treatment with a hot fluid, for a preset time interval, and with a cold fluid, for another preset time interval, and of alternately and successively repeating the treatment with hot fluid and cold fluid until the preset rehydration percentage is attained.

BRIEF DESCRIPTION OF THE DRAWINGS

Further characteristics and advantages of the invention will become apparent from the description of a preferred, but not exclusive, embodiment of an apparatus and of the related process for the rapid rehydration of legumes and the like, illustrated only by way of non-limitative example in the accompanying drawings, wherein:

FIG. 3 is a schematic view of an apparatus where hot fluid constituted by steam.

DESCRIPTION OF THE PREFERRED EMBODIMENTS

Figure 1:
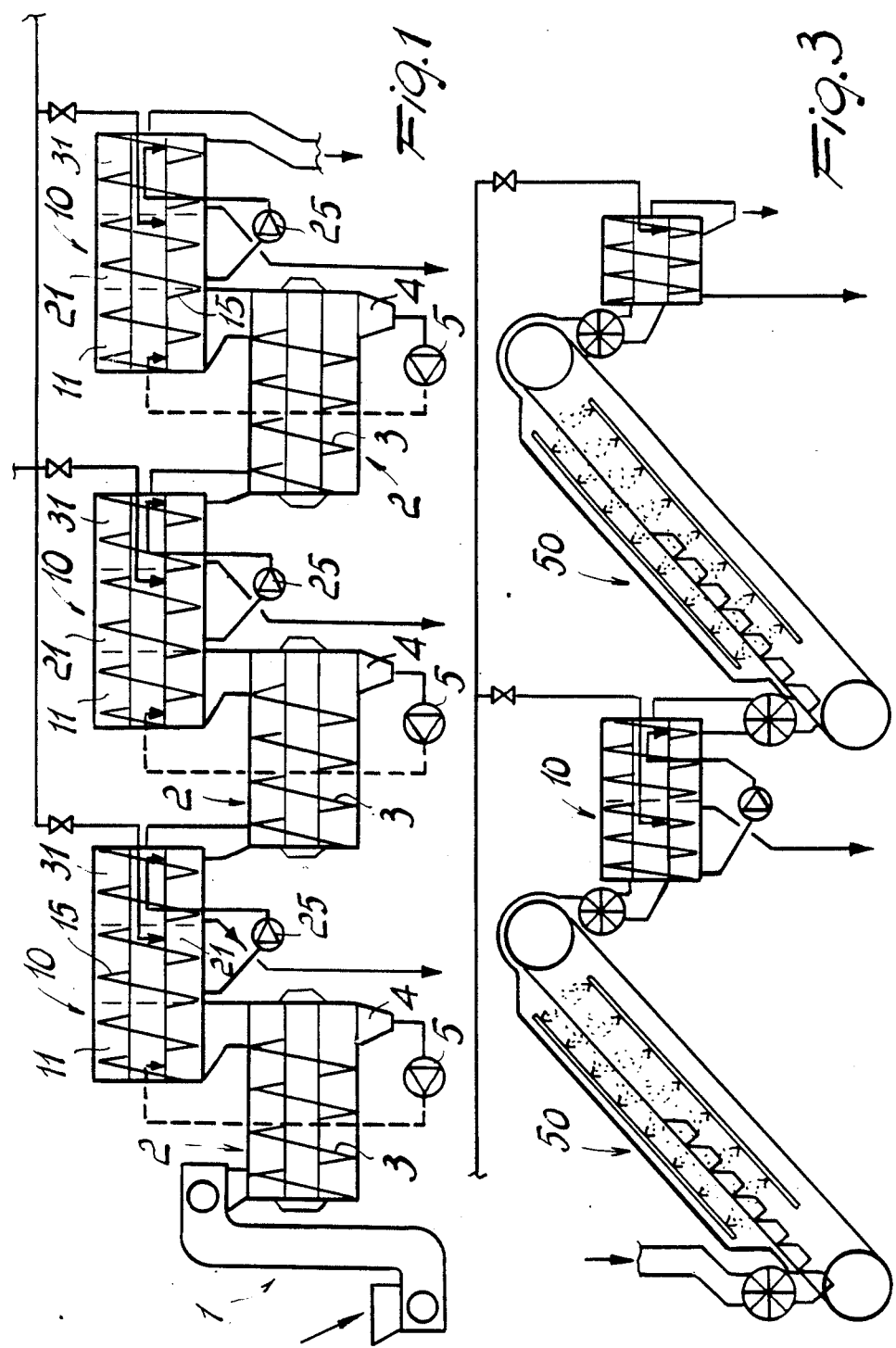
FIG. 1 is a schematic view of the apparatus according to the invention.
Figure 2:
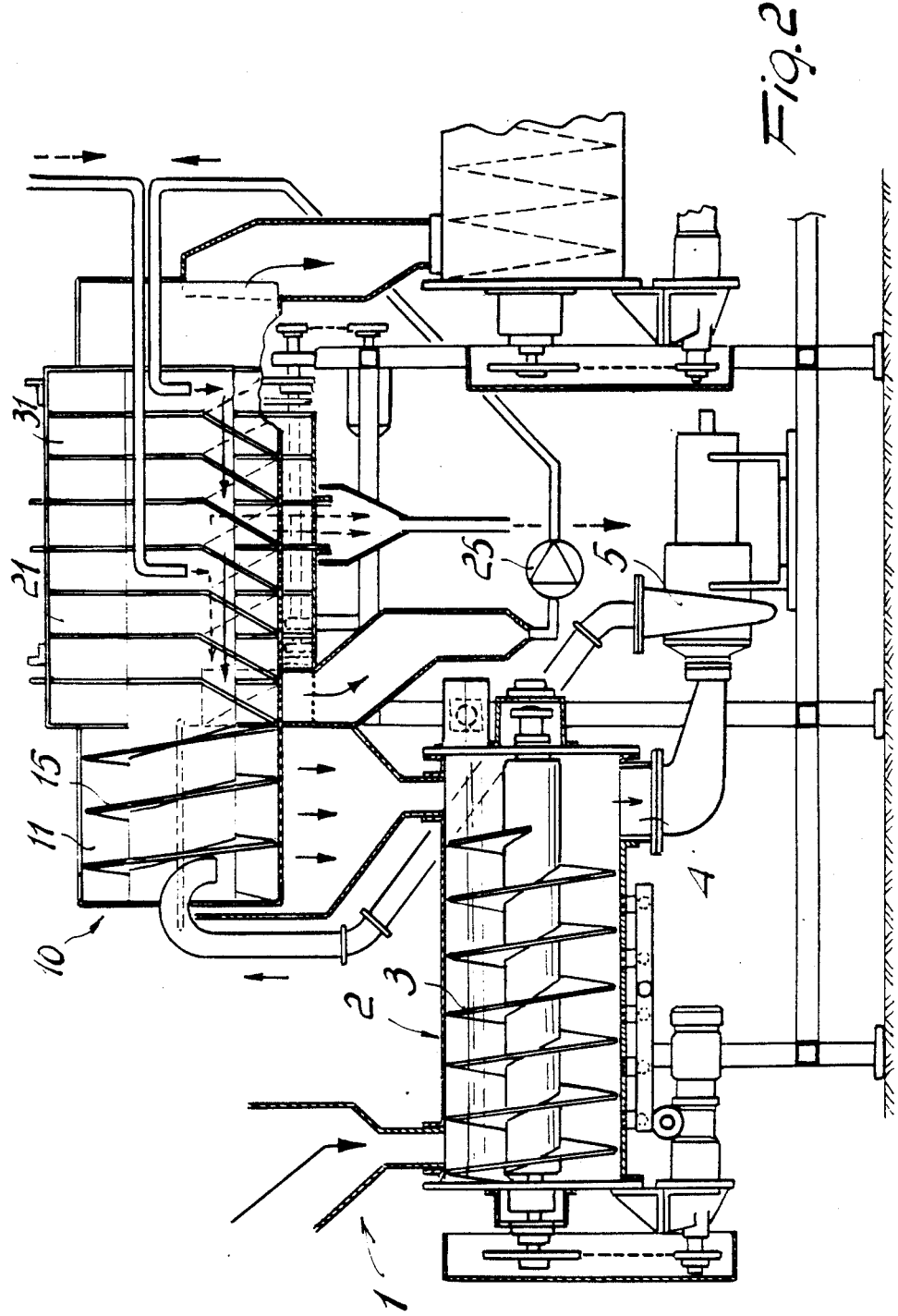
FIG. 2 is a schematic partial sectional view of a part of the apparatus for the treatment with hot fluid and with cold fluid.

With reference to the above described figures, and in particular to FIGS. 1 and 2, the apparatus comprises an assembly generally indicated by the reference numeral 1, which introduces the loose product to be rehydrated in a tank 2 containing water at a temperature above 80° C., preferably at a temperature of 95° C.

Inside said tank 2 there acts advancement means constituted by a first advancement screw feeder 3 which transfers the product to an output collector 4, arranged at the other end of the tank 2, where the product is taken up by transfer means such as for example a delivery pump 5, or by another mechanical elevator device, introducing it into a dripping and cooling assembly 10 which is preferably arranged at a higher level than to the tank 2.

The assembly 10 is provided with a first dripping region 11 where the hot water is separated from the product and reintroduced into the tank 2, thereby contributing to the prevention of energy waste.

Inside the assembly 10 an advancement element 15 is provided, for example again constituted by a screw feeder, which conveys the product from the first region 11 to a second region 21 where the product is sprayed with cold water having a temperature substantially lower than 60° C., preferably at tap temperature.

In the initial portion of the cooling section there acts an auxiliary pump, indicated by 25, which in practice recovers the water which was previously cold and then has been heated by the hot product moving upstream with respect to the inflow of said cold water.

At the end of said second region 21 the product has a temperature approximating or possibily lower than 40° C.

At the output from the second region 21 of the assembly 10, the product is introduced into a third preheating region, indicated by 31, which is affected in countercurrent by the preheated fluid drawn by the auxiliary pump 25, so that the product is preheated before it is again discharged into a section of the apparatus which is substantially identical to the one previously described, that is to say a further tank 2 containing hot water.

In practice, the product is thus subjected in a successive cyclic and alternating manner to steps of heating with hot water and to steps of cooling with cold or tepid water; the difference in temperature between the hot water and the cold or tepid water being preferably above 30° C.

Such alternate cycles of heating and cooling are repeated for a number of times which is a direct function of the type of legumes and of the rehydration characteristics which it is desired to obtain; on the average 4÷6 times are sufficient.

At the end of the apparatus a discharge assembly is provided where the product is dripped and sent to packaging, having undergone the required rehydration step.

It must be furthermore added that the step of treatment with hot fluid, as is schematically indicated in FIG. 3, can be provided by means of an inlet assembly for steam at 50° to 100° C., at atmospheric pressure, which strikes the product with jets of steam heating it.

The steps of heating the product to be rehydrated can also be performed with pressurized water or steam at temperatures above 100° C.

In practical operation, a process is provided which consists of alternately subjecting the loose product to be rehydrated to a step of heating with hot fluid, having a temperature substantially higher than 80°, perferably a temperature around 95° C., for a preset period of time, generally of the order of a few minutes and subsequently to a step of cooling with cold or tepid fluid at a temperature below 60°, preferably water at tap temperature, in a time generally shorter than the heating step, and in alternately and successively repeating the treatment with hot fluid and with cold fluid until the preset rehydration percentage is attained.

Moreover, another important aspect of the above described process resides in the fact that energy is recovered employing the hot fluids which are not dispersed, in fact the hot fluid which surrounds the product after the heating step is dripped off and returned to the heating tank assembly, and the cold fluid, heated by the product in the cooling step, is in turn recycled, so as to perform a preheating of the product before returning it to the tank or assembly where it undergoes the heating treatment.

From experimental tests performed it has been observed that for each kind of legumes it is possible to achieve, with an optimum number of alternated treatments, degrees of regeneration proximate to 100% in relatively short times, of the order of 30–40 minutes.

Experimentally it has been observed and verified that the repeated treatments with hot water-cold water or steam-cold water allow a much faster rehydration than the conventional one by immersion of the product in a room-temperature tank, the rate of rehydration depending on the characteristics of the product to be rehydrated and on the temperatures selected in the two treatment steps.

The high rehydration rate achieved is probably due to the fact that, by alternating heating steps and cooling steps, a pressure differential is created between the inside and the outside of the legumes which facilitates the absorption of water, in practice providing a "pump effect" which, by causing in a way the dilatation of the pores during the heating step, with their subsequent contraction in the cooling step, enormously facilitates the absorption of water inside the legumes.

From the experimental tests performed, it has been observed that the rapidly rehydrated legumes are perfectly suitable for the production of packaged sterilized products, indeed in some cases, such as for example with so-called "borlotti" beans, or round beans, a marked improvement in color and sheen has been observed with respect to the conventional treatment.

According to another aspect of the invention which is conceptually connected to the embodiment described above, the process can be carried out by subjecting the product, carried for example by a basket conveyor, to a steam spraying treatment by spraying steam downwardly and upwardly.

The steam injection can be carried out by means of saturated steam at atmospheric pressure or slightly overpressured steam.

Subsequently the product to be rehydrated is sprayed by water.

These treatment steps are repeated for a number of times depending on the desired amount of rehydration.

From what has been described it can thus be seen that the invention achieves the intended aims and in particular the fact is stressed that a process is provided which allows considerable energy savings, since the hot fluids employed are not directly dispersed outwards, but are used to perform the preheating of the product after the cooling step, and furthermore the product immersed in the hot fluid is dripped completely before the cooling step, consequently allowing the full energy recovery of the hot fluid.

The invention thus conceived is susceptible to numerous modifications and variations, all of which are within the scope of the inventive concept.

Furthermore, all the details may be replaced with other technically equivalent elements.

In practice, the materials employed, so long as compatible with the specific use, as well as the contingent shapes and dimensions, may be any according to the requirements.

I claim:

1. A process for rapid rehydration of dried legumes, comprising the steps of subjecting the legumes to a treatment with hot fluid having a temperature substantially above 80° C. for a preset time interval, then subjecting the legumes to a treatment with cold fluid having a temperature substantially below 60° C. for another preset time interval, with said cold fluid having a temperature lower than said hot fluid of at least 30° C., and repeating said treatments with hot and cold fluid until a preset rehydration percentage is attained with a total treatment time of about 30 to 40 minutes.

2. A process according to claim 1, wherein said hot fluid has a temperature of substantially 95° C.

3. A process according to claim 1, wherein said hot fluid is hot water at atmospheric pressure comprised between 90° C. and 100° C.

4. A process according to claim 1, wherein said hot fluid is steam at atmospheric pressure with a temperature of 100° C.

5. A process according to claim 1, wherein said hot fluid is pressurized fluid at a temperature above 100° C.

6. A process according to claim 1, wherein said cold fluid is water at tap temperature.

7. A process according to claim 1, further comprising the step of dripping the legumes after said treatment with hot fluid then recovering said hot fluid, recovered hot fluid being used for a further treatment of the legumes.

8. A process according to claim 1, wherein said cold fluid is fed to said legumes in countercorrent and is then recovered to obtain a recovered fluid, thereafter the recovered fluid is fed again to the legumes for preheating said legumes after the treatment with cold fluid and before the treatment with hot fluid.

9. A process for rapid rehydration of dried legumes, comprising the steps of subjecting the legumes to a treatment with hot fluid having a temperature substantially above 60° C. for a few minutes, then subjecting the legumes to a treatment with cold fluid having a temperature substantially below 60° C. for another few minutes, with said cold fluid having a temperature lower than said hot fluid of at least 30° C., and repeating said treatments with hot and cold fluid until a preset rehydration percentage is attained with a total treatment time of about 30 to 40 minutes.

10. A process according to claim 9, wherein said treatment with cold fluid is shorter than said treatment with hot fluid.

* * * * *